(12) United States Patent
Dotz et al.

(10) Patent No.: US 12,100,995 B2
(45) Date of Patent: Sep. 24, 2024

(54) ROTOR OF AN ELECTRICAL MACHINE

(71) Applicant: Valeo Siemens eAutomotive Germany GmbH, Erlangen (DE)

(72) Inventors: Boris Dotz, Bad Neustadt a.d.Saale (DE); Christian Finger-Albert, Bad Neustadt a.d.Saale (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 65 days.

(21) Appl. No.: 17/457,099

(22) Filed: Dec. 1, 2021

(65) Prior Publication Data
US 2022/0181928 A1 Jun. 9, 2022

(30) Foreign Application Priority Data
Dec. 3, 2020 (DE) ...................... 10 2020 215 316.7

(51) Int. Cl.
| | |
|---|---|
| *H02K 1/276* | (2022.01) |
| *B60K 1/00* | (2006.01) |
| *H02K 21/14* | (2006.01) |
| *H02K 29/03* | (2006.01) |

(52) U.S. Cl.
CPC ............ *H02K 1/276* (2013.01); *B60K 1/00* (2013.01); *H02K 21/14* (2013.01); *B60K 2001/001* (2013.01); *H02K 29/03* (2013.01)

(58) Field of Classification Search
CPC ...... H02K 1/276; H02K 21/14; H02K 1/2766; H02K 29/03; H02K 2213/03; H02K 2201/03; B60K 1/00; B60K 2001/001
USPC ..................................................... 310/156.56
See application file for complete search history.

(56) References Cited

U.S. PATENT DOCUMENTS

| 7,042,127 | B2 | 5/2006 | Tsuruta et al. | |
|---|---|---|---|---|
| 7,939,982 | B2* | 5/2011 | Horst ..................... | H02K 1/276 |
| | | | | 310/156.47 |
| 8,405,269 | B2* | 3/2013 | Spaggiari .............. | H02K 29/03 |
| | | | | 310/156.53 |
| 8,659,200 | B2* | 2/2014 | Adaniya ................ | H02K 21/16 |
| | | | | 310/156.57 |

(Continued)

FOREIGN PATENT DOCUMENTS

DE    102018123706 A1    3/2020

OTHER PUBLICATIONS

Extended European Search Report issued in European Application No. 21211666.9, dated Apr. 21, 2022 (8 pages).

*Primary Examiner* — Alex W Mok
(74) *Attorney, Agent, or Firm* — Osha Bergman Watanabe & Burton LLP

(57) ABSTRACT

Described is a rotor (3) for an electrical machine (1) which comprises a rotor laminated core (6) divided into a plurality of sectors (B), in each of which there is arranged a permanent magnet assembly (4) which has two permanent magnets (13a, 13n) which are arranged in a V shape and which are positioned symmetrically with respect to a plane of symmetry (C) splitting the sector (B) into two half-sectors (D, D'). An outer contour (E) of the rotor laminated core (6) runs in each sector (B) symmetrically with respect to the plane of symmetry (C) and is formed in one half-sector (D, D') by at least three different radii with just as many different centre points. The invention also relates to an electric machine (1) having such a rotor (3) and to a vehicle (17) having such an electric machine (1).

5 Claims, 4 Drawing Sheets

(56) References Cited

U.S. PATENT DOCUMENTS

| | | | |
|---|---|---|---|
| 8,816,555 B2 * | 8/2014 | Zhou | H02K 1/276 |
| | | | 310/156.56 |
| 9,071,117 B2 * | 6/2015 | Woolmer | H02K 21/24 |
| 2005/0156475 A1 * | 7/2005 | Ramu | H02K 1/246 |
| | | | 310/168 |
| 2010/0019612 A1 * | 1/2010 | Lefley | H02K 21/16 |
| | | | 310/216.076 |
| 2011/0050022 A1 | 3/2011 | Li et al. | |
| 2017/0104376 A1 | 4/2017 | Nakagawa et al. | |
| 2018/0175681 A1 * | 6/2018 | Tang | H02K 1/2706 |
| 2020/0195070 A1 * | 6/2020 | Tan | H02K 15/03 |

* cited by examiner

ROTOR OF AN ELECTRICAL MACHINE

TECHNICAL FIELD

The invention relates to a rotor for an electrical machine, which rotor comprises a rotor laminated core divided into a plurality of sectors, in each of which there is arranged a permanent magnet assembly which comprises two first permanent magnets which, as viewed from a rotational axis of the rotor, are positioned in a V shape and symmetrically with respect to a plane of symmetry splitting the sector into two half-sectors. An outer contour of the rotor laminated core runs in each sector symmetrically with respect to the plane of symmetry. Furthermore, an electrical machine with such a rotor, and a vehicle with such an electrical machine, are described.

PRIOR ART

On account of the arrangement of the permanent magnets provided in the rotor, undesired torque fluctuations occur during operation of the electrical machine. These can be reduced by varying the air gap between the rotor and the stator over the circumference. It is disadvantageous here that the outer contour thus created is the result of a mathematical calculation and has a relatively complex shape. This complexity on the one hand generates problems in respect of data transfer and on the other hand in respect of the production of the rotor. In particular, compatibility problems between various software platforms and misunderstandings in respect of the data transfer between the development division and the production line can lead to production errors. Also, not every machine—not even when computer-controlled—is able to produce complicated shapes. Ultimately, what is lacking is a simple description of the outer contour of the rotor or the rotor laminated core, which on the one hand reduces torque fluctuations during operation of the electrical machine, but on the other hand also allows a simple data transfer and simple production of the rotor or of the rotor laminated core.

DISCLOSURE OF THE INVENTION

It is therefore an object of the invention to provide an improved rotor for an electrical machine, an improved electrical machine, and an improved vehicle with such an electrical machine. In particular, a simple description of the outer contour of the rotor or of the rotor laminated core will be specified, which on the one hand reduces torque fluctuations during operation of the electrical machine, but on the other hand also allows a simple data transfer and simple production of the rotor or of the rotor laminated core.

The object of the invention is achieved by a rotor for an electrical machine, comprising a rotor laminated core divided into a plurality of sectors, in each of which there is arranged a permanent magnet assembly which comprises two first permanent magnets which, as viewed from a rotational axis of the rotor, are positioned in a V shape and symmetrically with respect to a plane of symmetry splitting the sector into two half-sectors, wherein an outer contour of the rotor laminated core runs in each sector symmetrically with respect to the plane of symmetry, and the outer contour of the rotor laminated core is formed in one half-sector of the half-sectors by at least three different radii with just as many different centre points.

The object of the invention is also achieved with an electrical machine which comprises a stator and a rotor of the above-mentioned type, which is mounted so as to be rotatable relative to the stator about the rotational axis of the rotor.

Finally, the object is also achieved by a vehicle with at least two axles, of which at least one is driven, wherein said driving action is performed at least partially or temporarily by the above-mentioned electrical machine.

By means of the proposed measures, the disadvantages cited initially may be overcome. In particular, a simple description of the outer contour of the rotor or of the rotor laminated core will be specified, which on the one hand reduces torque fluctuations during operation of the electrical machine, but on the other hand also allows a simple data transfer and simple production of the rotor or of the rotor laminated core. The outer contour is described here by at least three radii with a different centre point. Technical problems and misunderstandings in respect of the data transfer are avoided by the less complex description of the stated outer contour, thus eliminating or at least significantly reducing the risk of production errors. In addition, even the simplest numerical controls for machines are able to produce a contour based on radii.

In an advantageous variant of the invention, the outer contour of the rotor laminated core is formed in one half-sector of the half-sectors by precisely three different radii with three different centre points. The outer contour of the rotor or rotor laminated core is specified with particularly few radii.

It is particularly advantageous here if, starting from the plane of symmetry, the radii are arranged in succession from a first radius to a third radius in an anti-clockwise direction and
  the first radius is 71.5% of a reference length,
  the second radius is 50% of the reference length and
  the third radius is 74.4% of the reference length.
  In a further particularly advantageous embodiment
  the first radius has the centre point 5.73%/−12.17°,
  the second radius has the centre point 29.10%/11.70° and
  the third radius has the centre point 4.25%/30.00°,
wherein the centre points of the radii are specified in polar coordinates starting from the plane of symmetry with 0° in the anti-clockwise direction, wherein the polar coordinates are specified in the form "radius/angle", and wherein the radius is specified in percentage of the reference length.

In a further advantageous variant of the invention, the outer contour of the rotor laminated core is formed in one half-sector of the half-sectors by precisely four different radii with four different centre points. The torque fluctuations during operation of the electrical machine can thus be reduced better still, without excessively complicating the description of the outer contour of the rotor or rotor laminated core.

It is particularly advantageous here if, starting from the plane of symmetry, the radii are arranged in succession from a first radius to a fourth radius in an anti-clockwise direction and
  the first radius is 71.5% of a reference length,
  the second radius is 100% of the reference length,
  the third radius is 50% of the reference length and
  the fourth radius is 74.4% of the reference length.
  In a further particularly advantageous embodiment
  the first radius has the centre point 7.70%/0.00°,
  the second radius has the centre point 21.05%/193.18°,
  the third radius has the centre point 29.10%/11.70° and
  the fourth radius has the centre point 4.25%/29.58°,
wherein the centre points of the radii are specified in polar coordinates starting from the plane of symmetry with 0° in the anti-clockwise direction, wherein the polar coordinates are specified in the form "radius/angle", and wherein the radius is specified in percentage of the reference length.

In all cases the reference length can be selected arbitrarily depending on the desired size of the rotor. If, for example, 100 mm is selected as reference length, an absolute value of 71.5 mm for example results for the first radius, and so on.

It is also advantageous if the permanent magnet assembly additionally comprises two second permanent magnets which, as viewed from the rotational axis of the rotor, are positioned in a V shape and symmetrically with respect to a plane of symmetry splitting the sector into two half-sectors. The torque fluctuations during operation of the electrical machine can thus be further reduced.

It is noted at this juncture that the scope of protection is not limited to precisely the specified numerical values, and a tolerance range of in particular ±5% points of the reference length or ±5° of a specified angle are generally considered to be included by the scope of protection. If, for example, the first radius is nominally 71.5% of a reference length and if the centre point thereof lies at 7.70%/0.00°, in particular a range of 66.5% to 76.5% of the reference length for the radius, in particular a range of 2.7% to 12.7% of the reference length for the centre distance of the centre point, and in particular a range of −5° to +5° for the angle is thus included by the scope of protection.

The above refinements and developments of the invention may be combined in an arbitrary fashion.

BRIEF DESCRIPTION OF THE FIGURES

Exemplary embodiments of the invention are illustrated in an exemplary manner in the appended schematic figures. In the figures.

DETAILED DESCRIPTION OF THE INVENTION

Initially, it is stated that identical parts in the different embodiments are provided with the same reference signs or the same component designations, in some cases with different indices. The disclosures of a component contained in the description may accordingly be transferred to another component with the same reference sign or the same component designation. Also, the positional data selected in the description, such as for example "top", "bottom", "rear", "front", "side" etc. relate to the figure directly described and illustrated, and in the event of a position change, should be transferred accordingly to the new position.

Figure 1:
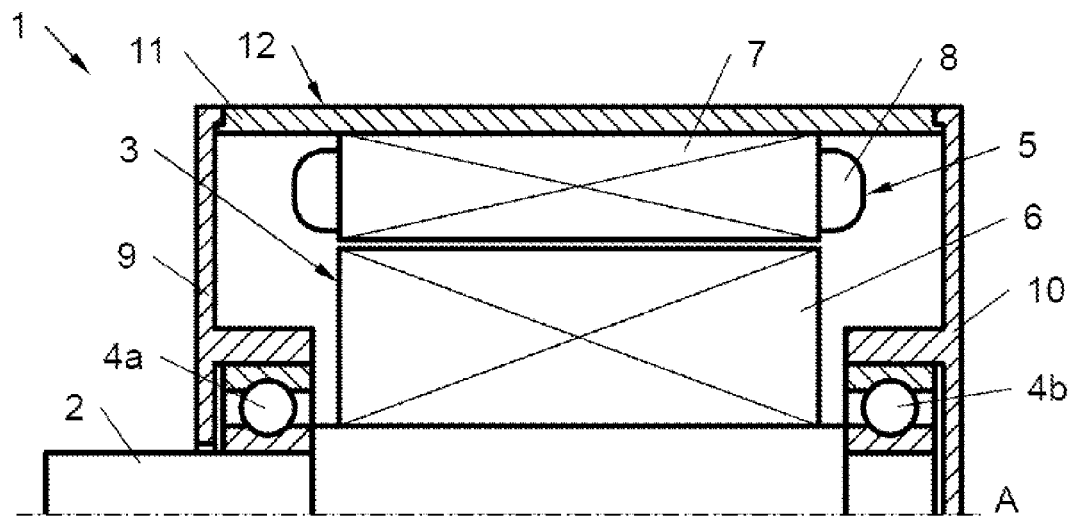
FIG. 1 shows a schematic half-sectional view of an exemplary electrical machine.

FIG. 1 shows a half-section through a schematically illustrated electrical machine 1. The electrical machine 1 comprises a shaft 2 with a rotor 3 sitting thereon, wherein the shaft 2 is mounted by means of (roller) bearings 4a, 4b so as to be rotatable relative to a stator 5 about a rotational axis A. In this example, the rotor 3 has a plurality of rotor laminations (not shown in detail), which form a rotor laminated core 6. The stator 5 in this example has a plurality of stator laminations (not illustrated in detail here), which form a stator laminated core 7, and also stator windings 8 arranged in the stator laminated core 7. Specifically, the first bearing 4a sits in a front end plate 9, and the second bearing 4b sits in a rear end plate 10. Furthermore, the electrical machine 1 comprises a (middle) housing part 11 which connects the front end plate 9 and rear end plate 10 and receives the stator 5. In this example, the front end plate 9, the rear end plate 10 and the housing part 11 form the housing 12 of the electrical machine 1.

Figure 2:
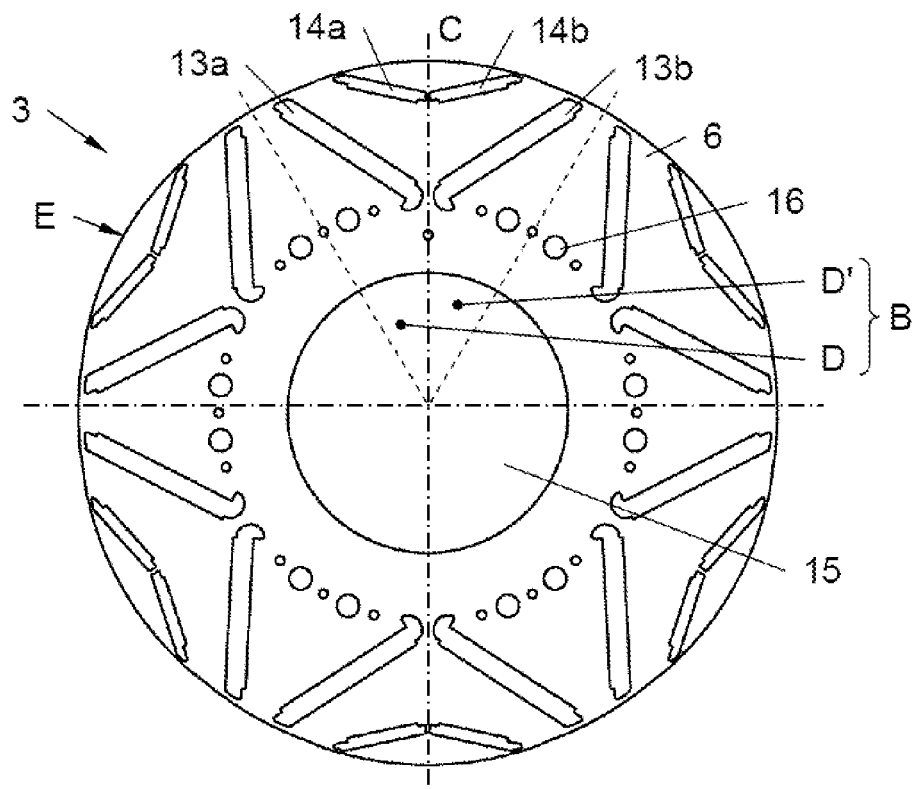
FIG. 2 shows a front view of the rotor shown in FIG. 1.

FIG. 2 now shows the rotor 3 of the electrical machine 1 in a front view. The rotor 3 can be divided in this example into a total of six sectors B arranged adjacently to one another. In each sector B there is arranged a permanent magnet assembly having two first permanent magnets 13a, 13b positioned (as viewed from the rotational axis A) in a V shape and symmetrically with respect to a plane of symmetry C. The plane of symmetry C extends in the axial and radial direction of the rotor 1 and splits the sector B into two half-sectors D, D'. In this case, the permanent magnet 13a lies in the half-sector D and the permanent magnet 13b in the half-sector D'. Each sector B forms a pole of the rotor 3. The rotor 3 or the rotor laminated core 6 has an outer contour E which deviates from the circular shape and which runs in each sector B symmetrically with respect to the plane of symmetry C and is the same in all sectors B.

Furthermore, the permanent magnet assembly 10 can comprise two optional second permanent magnets 14a, 14b arranged (as viewed from the rotational axis A) in a V shape and symmetrically with respect to the plane of symmetry C of the sector B, wherein the permanent magnet 14a is arranged in the half-sector D and the permanent magnet 14b is arranged in the half-sector D'. A radially innermost point of the second permanent magnets 14a, 14b lies radially further outwardly than a radially innermost point of the first permanent magnets 13a, 13b.

The number of sectors B or poles is merely exemplary. In other words, the technical teaching disclosed here is also applicable in an unlimited manner to a number of sectors B or poles deviating from six.

In addition, the rotor 3 has a through-bore 15, extending along the rotational axis A in an axial direction, for the rotor shaft 2 as well as further bores 16, which can serve to align the rotor laminations and/or to balance the rotor 3.

Figure 3:
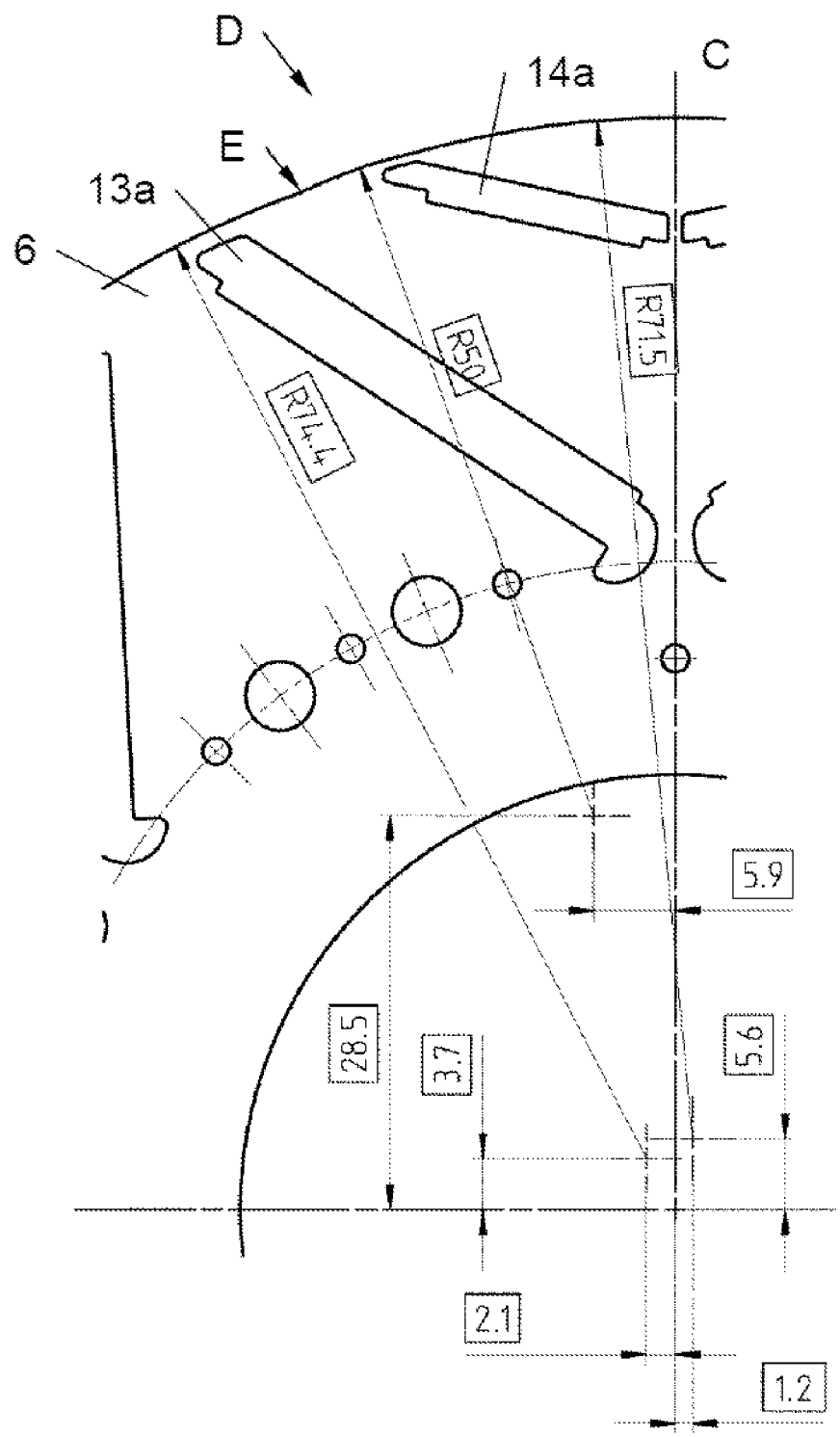
FIG. 3 shows a detailed view of a first embodiment of a half-sector of the rotor shown in FIG. 1.

FIG. 3 now shows a detailed illustration of the half-sector D of a first embodiment of the invention. The outer contour E of the rotor 3 or of the rotor laminated core 6 is in this example formed in a half-sector D by precisely three different radii with three different centre points.

Starting from the plane of symmetry C, the radii are preferably arranged in succession from a first radius to a third radius in an anti-clockwise direction, wherein
  the first radius is 71.5% of a reference length,
  the second radius is 50% of the reference length and
  the third radius is 74.4% of the reference length.

The centre points of the stated radii are preferably arranged here as follows:
  the first radius has the centre point 5.73%/−12.17°,
  the second radius has the centre point 29.10%/11.70° and
  the third radius has the centre point 4.25%/30.00°,
wherein the centre points of the radii are specified in polar coordinates starting from the plane of symmetry C with 0° in the anti-clockwise direction, wherein the polar coordinates are specified in the form "radius/angle", and wherein the radius is specified in percentage of the reference length.

In FIG. 3 Cartesian coordinates are specified instead of the polar coordinates, wherein the zero point for the polar coordinate system and the Cartesian coordinate system each lie in the rotational axis A of the rotor 3.

The reference length can be selected arbitrarily depending on the desired size of the rotor 3. If, for example, 100 mm is selected as reference length, an absolute value of 71.5 mm results for the first radius, and so on.

Figure 4:
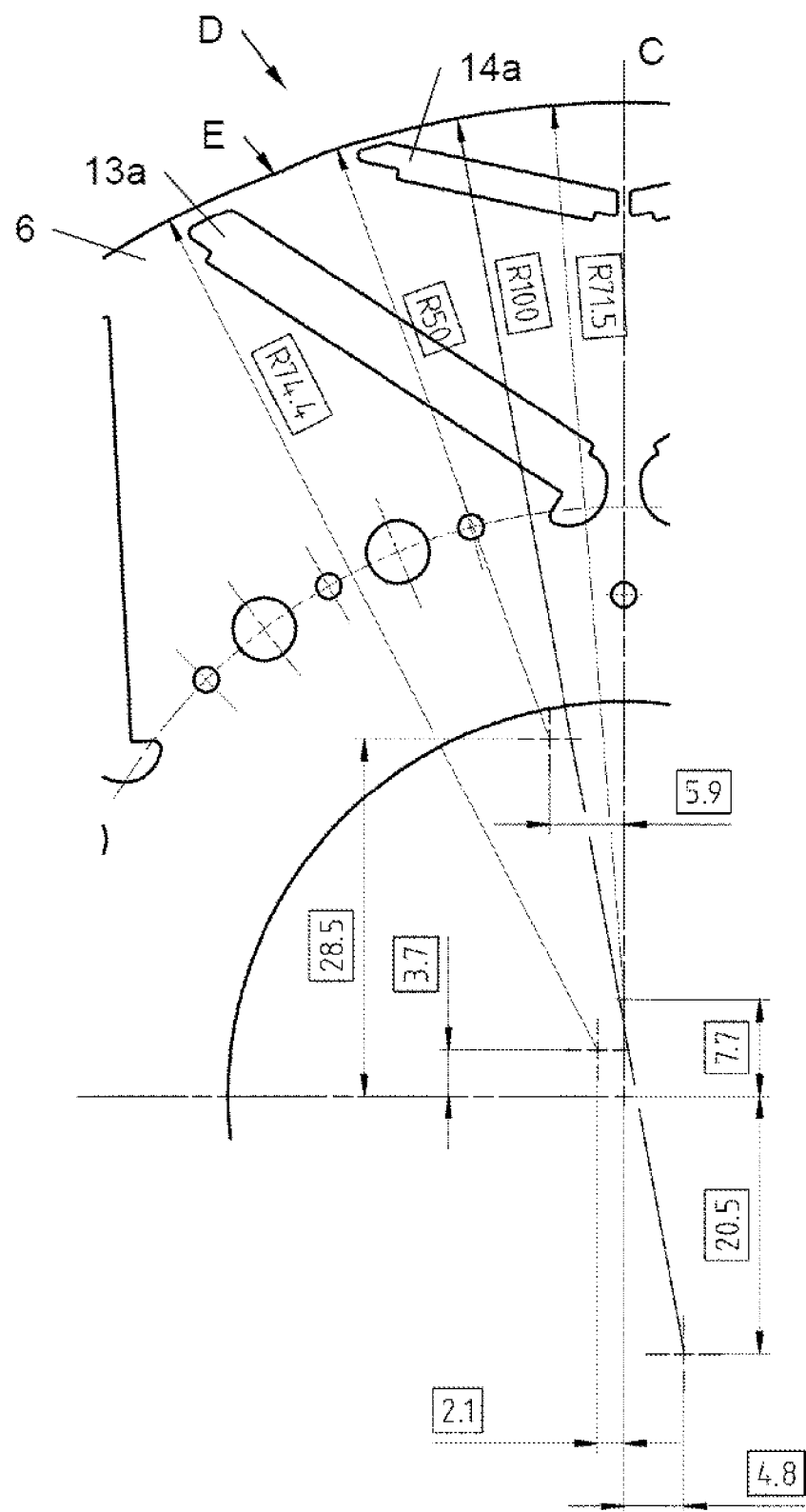
FIG. 4 shows a detailed view of a half-sector of the rotor shown in FIG. 1 in a second embodiment.

FIG. 4 now shows a detailed illustration of the half-sector D of a second embodiment of the invention. The outer contour E of the rotor 3 or of the rotor laminated core 6 is in this example formed in a half-sector D by precisely four different radii with four different centre points.

Starting from the plane of symmetry C, the radii are preferably arranged in succession from a first radius to a fourth radius in an anti-clockwise direction, wherein the first radius is 71.5% of a reference length,
the second radius is 100% of the reference length,
the third radius is 50% of the reference length and
the fourth radius is 74.4% of the reference length.

The centre points of the stated radii are preferably arranged here as follows:

the first radius has the centre point 7.70%/0.00°,
the second radius has the centre point 21.05%/193.18°,
the third radius has the centre point 29.10%/11.70° and
the fourth radius has the centre point 4.25%/29.58°, wherein the centre points of the radii are specified in polar coordinates starting from the plane of symmetry C with 0° again in the anti-clockwise direction, wherein the polar coordinates are specified in the form "radius/angle", and wherein the radius is specified in percentage of the reference length.

In FIG. 4 Cartesian coordinates are likewise specified instead of the polar coordinates, wherein the zero point for the polar coordinate system and the Cartesian coordinate system each lie in the rotational axis A of the rotor 3.

The reference length can again be selected arbitrarily depending on the desired size of the rotor 3. If 100 mm is selected as reference length, an absolute value of 71.5 mm results for the first radius, and so on.

Due to the proposed measures, the width of the air gap between the rotor 3 and the stator 5 is varied such that the torque fluctuations during operation of the electrical machine 1 are flattened. The electrical machine 1 thus runs more smoothly. The proposed measures are advantageously based on simple specifications, and there is no need to specify a complex mathematical formula for the outer contour. The data transfer is thus simplified, and the rotor 3 can be easily produced.

Figure 5:
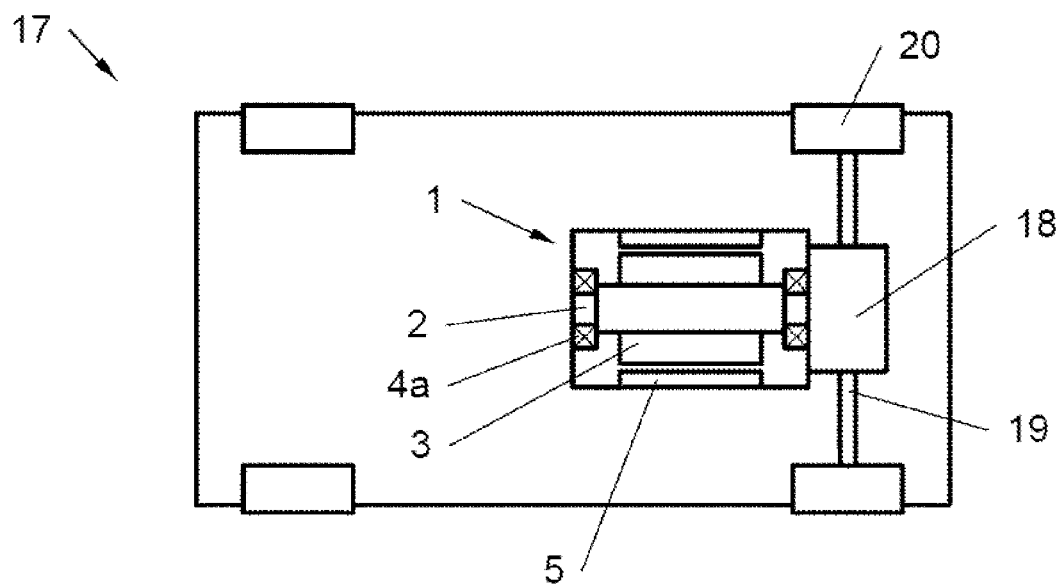
FIG. 5 shows a schematic view of a vehicle with an electrical machine with the rotor according to the invention.

FIG. 5 finally shows the electrical machine 1 which is installed in a vehicle 17. The vehicle 17 has at least two axles, at least one of which is driven. Specifically, the electric motor 1 is connected to an optional gearbox 18. The half-shafts 19 of the rear axle adjoin the gearbox 18. Finally, the driven wheels 20 are mounted on the half-shafts 19. The driving action of the vehicle 17 is performed at least partially or temporarily by the electrical machine 1. This means that the electrical machine 1 may serve for exclusively driving the vehicle 17, or for example may be provided in conjunction with an internal combustion engine (hybrid drive).

Finally, it is established that the scope of protection is determined by the patent claims. The description and the drawings should however be used to interpret the claims. The features contained in the figures may be interchanged and combined with one another in an arbitrary fashion. In particular, it is also noted that the devices illustrated may in reality also comprise more or else fewer component parts than illustrated. In some cases, the illustrated devices or their component parts may also not be illustrated to scale and/or may be increased in size and/or reduced in size.

The invention claimed is:

1. A rotor for an electrical machine, comprising:
a rotor laminated core divided into a plurality of sectors, in each of which there is arranged a permanent magnet assembly which comprises two first permanent magnets which, as viewed from a rotational axis of the rotor, are positioned in a V shape and symmetrically with respect to a plane of symmetry splitting the sector into two half-sectors,
wherein an outer contour of the rotor laminated core runs in each sector symmetrically with respect to the plane of symmetry, and the outer contour of the rotor laminated core is formed in one half-sector of the half-sectors by four different radii with four different centre points, and
wherein, the permanent magnet assembly additionally comprises two second permanent magnets which, as viewed from the rotational axis of the rotor, are positioned in a V shape and an angle of intersection of the two second permanent magnets is greater than 110 degrees.

2. A rotor according to claim 1, wherein starting from the plane of symmetry, the radii are arranged in succession from a first radius to a fourth radius in an anti-clockwise direction and
the first radius is 71.5% of a reference length,
a second radius is 100% of the reference length,
a third radius is 50% of the reference length and
the fourth radius is 74.4% of the reference length.

3. A rotor according to claim 2, wherein
the first radius has the centre point 7.70%/0.00°,
the second radius has the centre point 21.05%/193.18°,
the third radius has the centre point 29.10%/11.70° and
the fourth radius has the centre point 4.25%/29.58°,
wherein the centre points of the radii are specified in polar coordinates starting from the plane of symmetry with 0° in the anti-clockwise direction, wherein the polar coordinates are specified in the form "radius/angle", and wherein the radius is specified in percentage of the reference length.

4. An electrical machine with a stator, characterized by a rotor according to claim 1 which is mounted so as to be rotatable relative to the stator about the rotational axis of the rotor.

5. A vehicle with at least two axles, of which at least one is driven, wherein a driving action of at least one of the at least two axles is performed at least partially or temporarily by the electrical machine according to claim 4.

\* \* \* \* \*